US009467483B2

(12) United States Patent
Jolfaei et al.

(10) Patent No.: US 9,467,483 B2
(45) Date of Patent: Oct. 11, 2016

(54) ABAP CHANNELS FOR EVENT SIGNALING

(71) Applicants: Masoud Aghadavoodi Jolfaei, Wiesloch (DE); Oliver Luik, Wiesloch (DE); Edgar Lott, Nussloch (DE); Helmut Prestel, Bad Schönborn (DE); Brian Craig McKellar, Heidelberg (DE); Steffen Knoeller, Neupotz (DE)

(72) Inventors: Masoud Aghadavoodi Jolfaei, Wiesloch (DE); Oliver Luik, Wiesloch (DE); Edgar Lott, Nussloch (DE); Helmut Prestel, Bad Schönborn (DE); Brian Craig McKellar, Heidelberg (DE); Steffen Knoeller, Neupotz (DE)

(73) Assignee: SAP SE, Walldorf (DE)

( * ) Notice: Subject to any disclaimer, the term of this patent is extended or adjusted under 35 U.S.C. 154(b) by 491 days.

(21) Appl. No.: 13/722,529

(22) Filed: Dec. 20, 2012

(65) Prior Publication Data
US 2014/0181217 A1 Jun. 26, 2014

(51) Int. Cl.
H04L 29/06 (2006.01)
G06F 9/54 (2006.01)
H04L 29/08 (2006.01)

(52) U.S. Cl.
CPC ............ H04L 65/1066 (2013.01); G06F 9/542 (2013.01); G06F 9/546 (2013.01); H04L 67/14 (2013.01); H04L 67/141 (2013.01)

(58) Field of Classification Search
CPC . H04L 65/1066; H04L 67/141; H04L 67/14; G06F 9/546; G06F 9/542
USPC .................................................. 709/206, 227
See application file for complete search history.

(56) References Cited

U.S. PATENT DOCUMENTS

| 2009/0158397 A1* | 6/2009 | Herzog et al. ..................... 726/4 |
| 2011/0173681 A1* | 7/2011 | Qureshi et al. .................... 726/4 |
| 2012/0079066 A1* | 3/2012 | Li et al. ......................... 709/217 |
| 2012/0278854 A1* | 11/2012 | Ton et al. ......................... 726/3 |
| 2012/0297031 A1 | 11/2012 | Danielsson et al. |
| 2013/0097239 A1* | 4/2013 | Brown et al. .................. 709/204 |
| 2014/0012997 A1* | 1/2014 | Erbe ........................ H04L 67/26 709/228 |
| 2014/0101270 A1* | 4/2014 | Woo et al. ..................... 709/206 |

OTHER PUBLICATIONS

Giotta et al., Copyright Pages, from *Professional JMS Programming*, Birmingham, Eng: APress, 4 pages. (2000).
Eugster et al., "The many faces of publish/subscribe," ACM Comput. Surv. 35(2):114-131 (2003).
(Continued)

*Primary Examiner* — Brian J Gillis
*Assistant Examiner* — Steve Lin
(74) *Attorney, Agent, or Firm* — Mintz Levin Cohn Ferris Glovksy and Popeo, P.C.

(57) ABSTRACT

A system, a method and a computer-program product for exchanging communications between user sessions are provided. A first push channel and a first messaging channel on a first application server for connecting a first client to the first application server are established. The first messaging channel communicates with the first push channel, where both channels form a first session corresponding to the first client. A second push channel and a second messaging channel on a second application server for connecting a second client to the second application server are established. The second messaging channel communicates with the second push channel, where both channels form a second session corresponding to the second client. The first and second application servers communicate on a communication network. Messages are exchanged between the first and second messaging channels to form a connection between the first and second clients.

18 Claims, 17 Drawing Sheets

(56) References Cited

OTHER PUBLICATIONS

Comet (programming), published Jan. 15, 2016 [online] [retrieved on Jan. 29, 2016]. Retrieved from the Internet <URL: <http://en.wikipedia.org/wiki/Comet_(programming)>, 3 pages.
Real-Time web—Wikipedia, published Jan. 1, 2016 [online] [retrieved on Jan. 29, 2016]. Retrieved from the Internet <URL: <<http://en.wikipedia.org/wiki/Real-time web>, 3 pages.
Java Message Service—Wikipedia, published Dec. 30, 2015 [online] [retrieved on Jan. 29, 2016]. Retrieved from the Internet <URL: <<http://en.wikipedia.org/wiki/Java_Message_Service>, 4 pages.
Apache ActiveMQ—Wikipedia, published Dec. 18, 2015 [online] [retrieved on Jan. 29, 2016]. Retrieved from the Internet <URL: <<http://en.wikipedia.org/wiki/Apache_ActiveMQ> 2 pages.
Extensible Messaging and Presence Protocol (XMPP):—Wikipedia, published Dec. 18, 2015 [online] [retrieved on Jan. 29, 2016]. Retrieved from the Internet <<<URL: http://en.wikipedia.org/wiki/Extensible_Messaging_and_Presence_Protocol>, 11 pages.
HTML5—Wikipedia, published Jan. 27, 2016 [online] [retrieved on Jan. 29, 2016]. Retrieved from the Internet <URL: <<http://en.wikipedia.org/wiki/HTML5>, 12 pages.
The Websocket protocol, draft-ietf-hybi-thewebsocketprotocol-17, published Sep. 30, 2011 [online] [retrieved on Jan. 29, 2016]. Retrieved from the Internet <URL: <<http://tools.ietf.org/html/draft-ietf-html/draft-ietf-hybi-thewebsocketprotocol-17>, 77 pages.
WebSocket—Wikipedia, published Jan. 27, 2016 [online] [retrieved on Jan. 29, 2016]. Retrieved from the Internet <URL: <<http://de.wikipedia.org/wiki/WebSocket>, 4 pages. [in German].
Polling (computer science)—Wikipedia, published Dec. 10, 2015 [online] [retrieved on Jan. 29, 2016]. Retrieved from the Internet <URL: <<http://en.wikipedia.org/wiki/Real-time_web> 3 pages.
W3C WebSocket, [online] [retrieved on Jan. 29, 2016]. Retrieved from the Internet <URL: http://dev.w3.org/html5/websockets/, [online] 1 page and redirected to HTML Standard, published Jan. 29, 2016 [online] [retrieved on Jan. 29, 2016]. Retrieved from the Internet <URL: <<http://html.spec.whatwg.org/multipage/comms.html>, 34 pages.
Kalt, C.; "Internet Relay Chat: Architecture; rfc2810.txt"; 5. JCT-VC Meeting 96, MPEG Meeting; 2011; 9 pages.
European Search Report for EP Application No. 13004177.5, dated Jun. 20, 2016.

* cited by examiner

ABAP CHANNELS FOR EVENT SIGNALING

TECHNICAL FIELD

This disclosure relates generally to data processing and, in particular, to exchanges of various communications between client sessions.

BACKGROUND

Businesses implement and rely on a plurality of business process applications and software in their day-to-day activities. Such business process software can run various networks that have a multitude of users connected to it. The users can create, design, run, update and/or otherwise use the networks and/or business process applications residing on such networks. Each user's connection to the network and/or use of the business process applications can be deemed a session. Some applications interact with one another, thereby creating a collaborative environment, where various user sessions communicate and/or exchange messages between one another. The session communications can involve various clients (e.g., applications) and servers that connect such clients.

Conventional solutions for exchange of messages between sessions (with or without user interface access) can be realized via a polling mechanism. However, such a mechanism can have various drawbacks for both clients and servers. For example, when exchanging messages, various data can be communicated between clients and/or servers and although there can exist instances where no data is ready and waiting at the server, the client can poll the server for new data, thereby running into busy-waiting phases, which can extend processing time and delay user's access to resources and applications. On the server side, the unnecessary requests can lead to a waste of server and system resources, e.g., by occupying processes, allocating memory, consumption of CPU time, an increasing the access load to a database, etc.

SUMMARY

In some implementations, the current subject matter relates to a computer implemented method. The method includes establishing a first push channel on a first application server for connecting a first client to the first application server, establishing a first messaging channel on the first application server, wherein the first messaging channel communicates with the first push channel, the first push channel and the first messaging channel to form a first session corresponding to the first client, establishing a second push channel on a second application server for connecting a second client to the second application server, wherein the first and second application servers communicate on a communication network, establishing a second messaging channel on the second application server, wherein the second messaging channel communicates with the second push channel, the second push channel and the second messaging channel to form a second session corresponding to the second client, and exchanging messages between the first messaging channel and the second messaging channel to form a connection between the first client and the second client. At least one of the establishing the first push channel, the establishing the first messaging channel, the establishing the second push channel, the establishing the second messaging channel, and the exchanging can be performed on at least one processor.

In some implementations, the current subject matter can include one or more of the following optional features. The first push channel and the second push channel can be advanced business application programming push channels. The first messaging channel and the second messaging channel can be advanced business application programming messaging channels. The exchanged messages can include a connection request from at least one of the first client and the second client. Each messaging channel can include at least one attribute containing at least one of the following: a channel group identification, a channel identification, a channel access scope, a channel access right, and a message type identification. The channel group identification can identify channels that are grouped together. The channel identification can be an identifier for a channel belonging to the channel group. The channel access scope can define whether a channel is cross-client or client-specific. The channel access right can represent access rights for the channels. The message type identification can specify a message type assigned to a channel. The first and second clients can be browsers. The first and second push channels can implement a WebSocket protocol to establish a bi-directional communication between the first and second clients and first and second application servers, respectively. Exchanging of messages can include at least one of the following: an exchanging of messages during an advanced business application programming (ABAP) push channel communication between an ABAP push channel client and a server, an exchanging of messages during an ABAP messaging channel communication between sessions, and an exchanging of messages during a communication between an ABAP push channel client and an ABAP messaging channel session by connecting ABAP messaging channel to ABAP push channel client.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
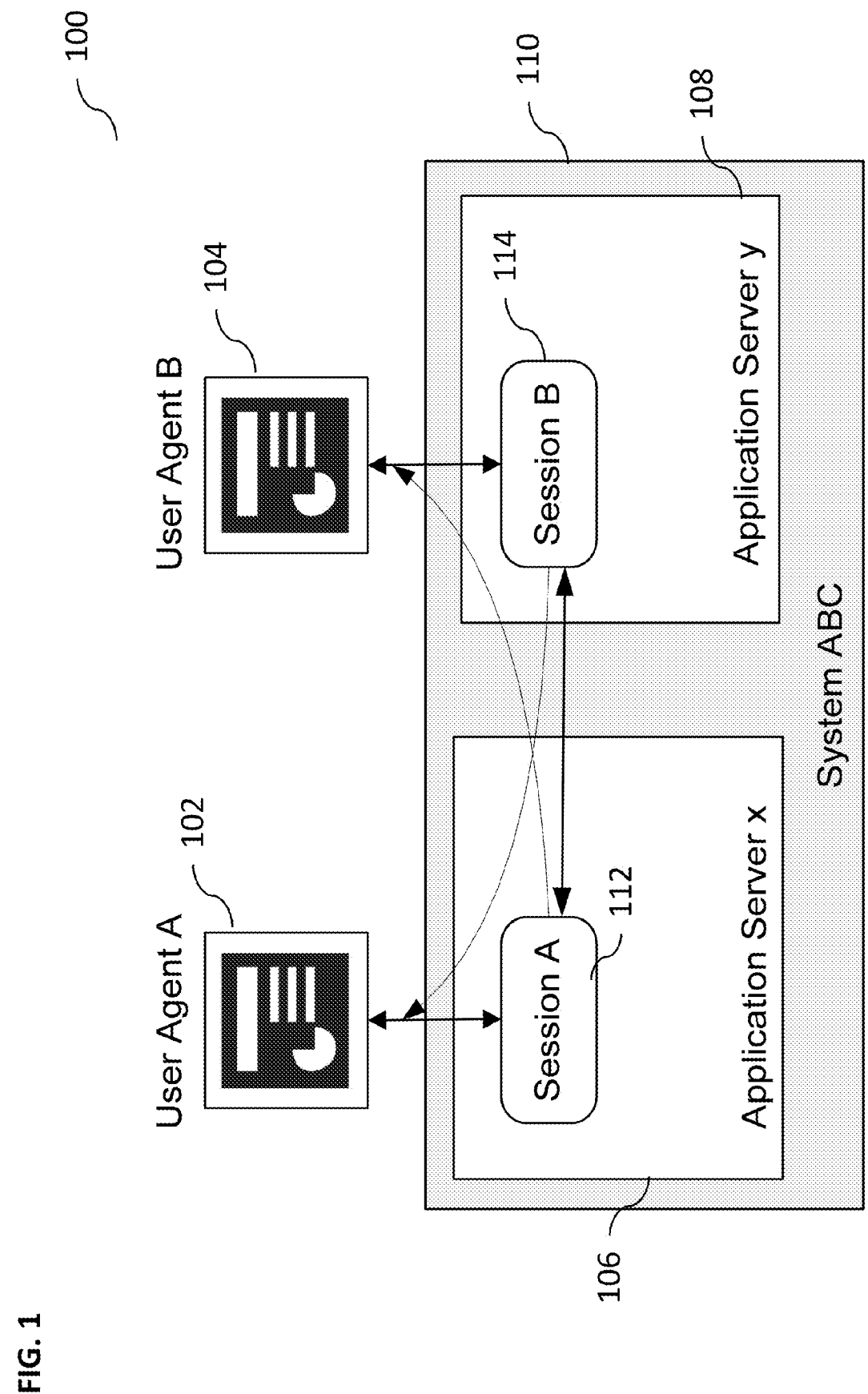
FIG. 1 illustrates an exemplary system for implementing a push channel for providing communications between various client applications, according to an embodiment.

FIG. 1 illustrates an exemplary system 100 for implementing a push channel for providing communications between various client applications. The system 100 can provide an interactive and collaborative environment for allowing users to obtain update notifications. The environment can include at least one event-driven user interface that can be used by an end user and where the end user can call for real-time web behavior. The real-time web behavior can include a set of technologies and practices that can enable users to receive information as soon as it is published by its authors, rather than requiring that they or their software check a source periodically for updates. System 100 shown in FIG. 1 can provide an infrastructure to exchange messages between user agents (e.g., browsers and/or other applications) and user interface sessions that can reside on different application servers within the same system.

The system 100 can include a user A 102 and a user B 104, where user A 102 can have a session A 112 that can reside on an application server X 106 within system ABC 110 and user B 104 can have a session B 114 that can reside on an application server Y 108 within the system ABC 110. The users 102, 104 can communicate with one another directly, indirectly, using a communication protocol between session A 112 and session B 114, and/or using any other communication protocols as well as any other sessions. The communication channels may also be established between the user A 102 and session B 114 as well as between the user B 104 and session A 112. In some implementations, sessions A and B can be user interface sessions, advanced business application programming ("ABAP" as developed by SAP AG, Walldorf, Germany) sessions, and/or any other sessions. The current subject matter can provide a technology for pushing messaging efficiently between ABAP, user interface sessions, and/or any other session including their respective user agents, as shown in FIG. 1.

In some implementations, the current subject matter may provide a push channel that can enable bi-directional communication with user agents (e.g., via the integration of WebSockets) in the SAP NetWeaver Application Server available from SAP AG, Walldorf, Germany. The current subject matter system can also provide a publish/subscribe infrastructure for exchange of messages between different user sessions residing on different SAP NetWeaver Application Servers to user agents. The publish/subscribe infrastructure can include a messaging pattern where senders or publishers of messages do not program the messages to be sent directly to specific receivers or subscribers, and instead, the published messages can be characterized into classes without knowledge of who the subscribers are. Subscribers can express interest in one or more classes and only receive messages that are of interest without knowledge of who the publishers are.

In some implementations, the current subject matter's message exchanges between sessions and user interface sessions can be provided by both a WebSocket and the communication channels, e.g., ABAP messaging channels, that can be integrated in an application server (e.g., SAP NetWeaver Application Server). WebSocket protocol can provide a bi-directional communications channel over a Transmission Control Protocol/Internet Protocol ("TCP/IP") socket. The WebSocket protocol can be designed to be implemented in web browsers and web servers and can be used by any client or server application. The aspects of a WebSocket application programming interface ("API") used by the current subject matter's system can be determined by the World Wide Web Consortium ("W3C") standards organization and the WebSocket Protocol can be governed by the Internet Engineering Task Force ("IETF") standards organization, and in particular, the RFC 6455 standard.

A successful connection in the ABAP engine can be ensured via a correct authentication and identification of the ABAP Push Channel application. The ABAP engine can refer to a programming core of an ABAP program, where the programming core drives various functionalities of the ABAP program. An exemplary ABAP engine is provided by SAP AG, Walldorf, Germany. After connection setup, the ABAP Push Channel can instantiate and execute the addressed ABAP Push Channel Application (in the same ABAP Push Channel user session; in the present description, the terms ABAP Push Channel Application and WebSocket Application are synonymous and are used interchangeably; similarly, the terms ABAP Push Channel user session and the WebSocket user session are synonymous and are used interchangeably). The WebSocket channel can be used bi-directionally for communication between a WebSocket client (which can correspond to a browser, e.g., an HTML5 browser) and an application. The WebSocket integration into the ABAP engine can enable a push channel from an ABAP Push Channel user session to its user agent. Additional publish/subscribe messaging can enable the transfer of messages from any user session on any application server in a system to a user agent.

Figure 2:
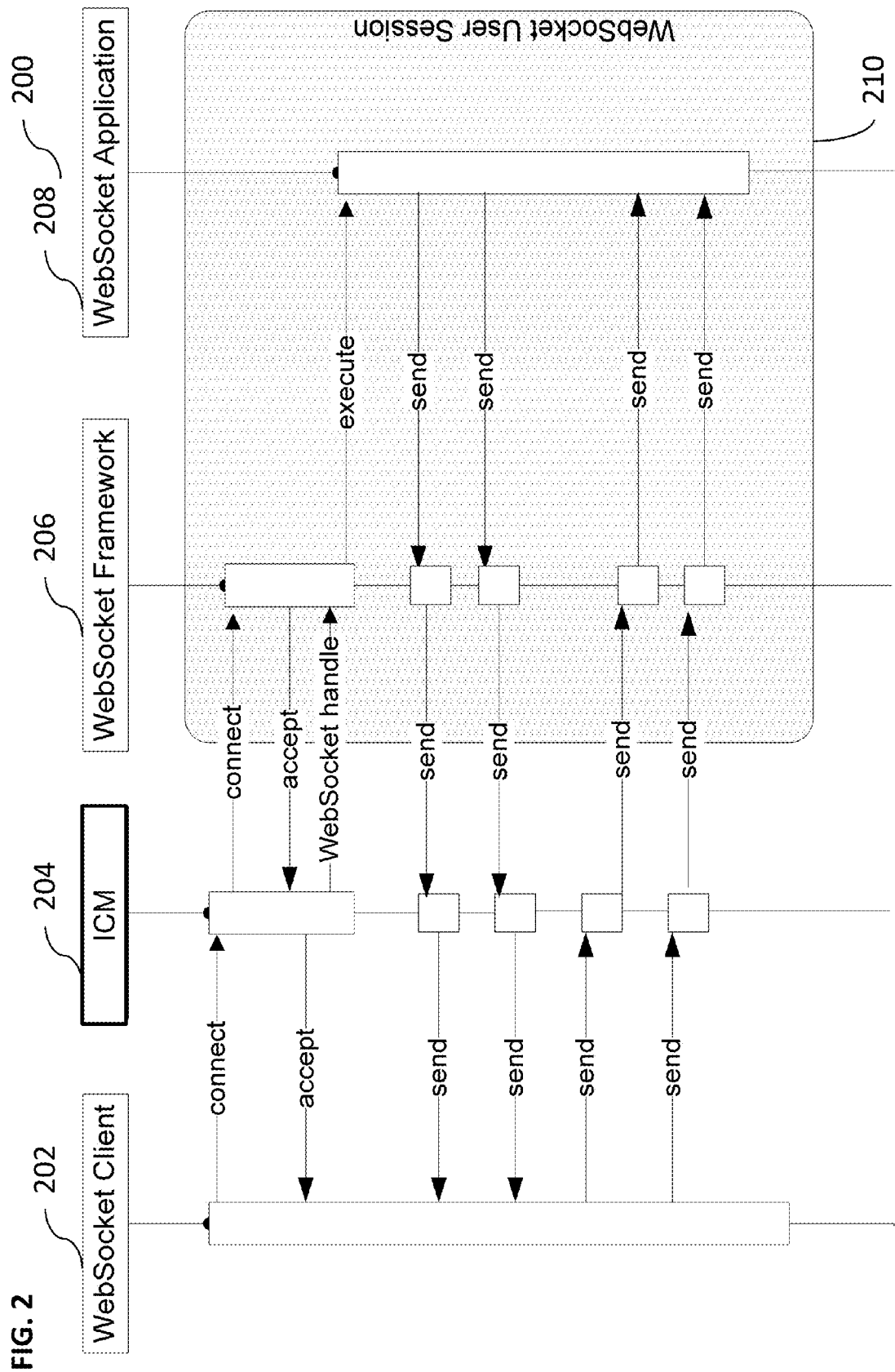
FIG. 2 illustrates an exemplary interaction process of the ABAP Push Channel in the ABAP engine, according to an embodiment.

FIG. 2 illustrates an exemplary interaction process 200 of the WebSocket protocol in the ABAP engine, according to some implementations of the current subject matter. A WebSocket client 202 can send a connect request to an internet communications manager ("ICM") 204, which can forward the connect request to the ABAP Push Channel user session 210 and in particular to the ABAP Push Channel framework 206. ICM 204 can provide connection between the client and user sessions. In some implementations, ICM 204 can provide communication between a web application server and an outside world via various protocols (e.g., HTTP, HTTPS, SMTP, etc.). It can process requests from the Internet that arrive as universal resource locators ("URLs") and pass the requests to local handlers (e.g., applications, databases, etc.) for generating a response to the requests. The WebSocket framework 206 can indicate acceptance of the request by an appropriate "accept" notification to the ICM 204, which, in turn, can send the "accept" indication to the WebSocket client 202 and send a WebSocket handle to the WebSocket framework 206, which can then be used in the ABAP Push Channel application 208. The acceptance can be indicated after a successful check of at least one condition (e.g., whether the requested sub-protocol by the WerbSocket client is supported by the ABAP Push Channel application). Once the connection between the WebSocket client 202 and the ABAP Push Channel application 208 is established, data can be exchanged between the WebSocket client 202 and the ABAP Push Channel application 208.

Figure 3:
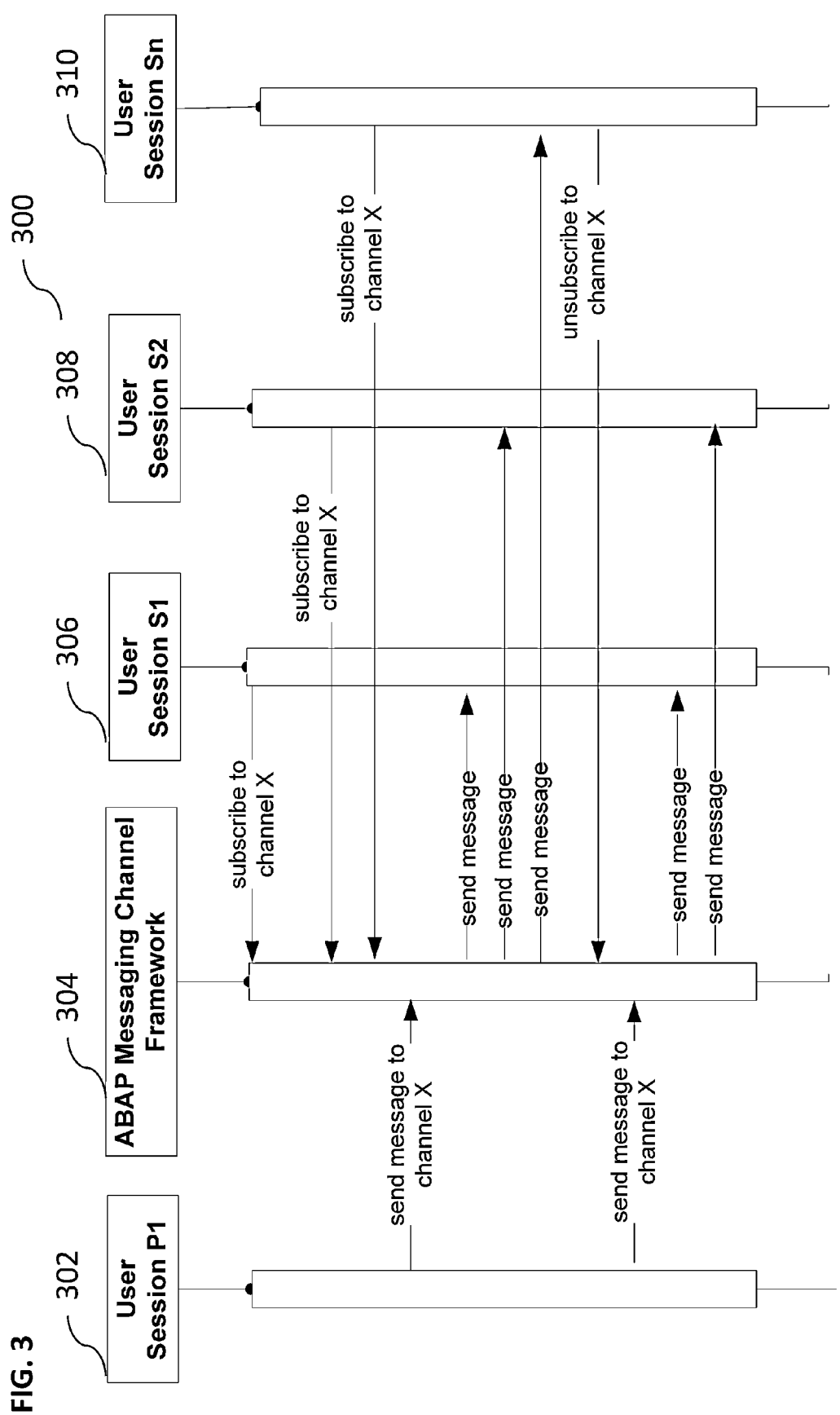
FIG. 3 illustrates an exemplary ABAP messaging channel, according to an embodiment.

In some implementations, the current subject matter can establish ABAP messaging channels for the purposes of exchanging messages between clients and applications. ABAP messaging channels ("AMC") can provide publish/subscribe messaging, where participants can communicate with one another by sending and receiving messages asynchronously referring to a channel. FIG. 3 illustrates an exemplary ABAP messaging channel 300, according to some implementations of the current subject matter. FIG. 3 shows an exchange of messages between different user sessions (i.e., user session P1 302, user session S1 306, user session S2 308 . . . user session Sn 310). The user session P1 302 can publish a message to a specified channel and the user session Si (i=1, 2, . . . , n) can indicate a start/stop of receiving of messages by subscribing/unsubscribing to the channel. The process 300 can be implemented through use of an ABAP messaging channel framework 304 that can connect various user sessions to channel X, as shown in FIG. 3. The user session P1 302 can send a message to channel X via ABAP messaging channel framework 304. The user sessions S1, S2, . . . , Sn can subscribe and/or unsubscribe to/from the channel X via the ABAP messaging channel framework 304, where subscriptions can allow user sessions S1, S2, . . . , Sn to receive messages sent from the user session P1 302 via the ABAP messaging channel framework 304. If the user sessions S1, S2, . . . , Sn are not subscribed to the channel X, then they are unable to receive such messages or otherwise communicate with the user session P1 302.

Figure 4:
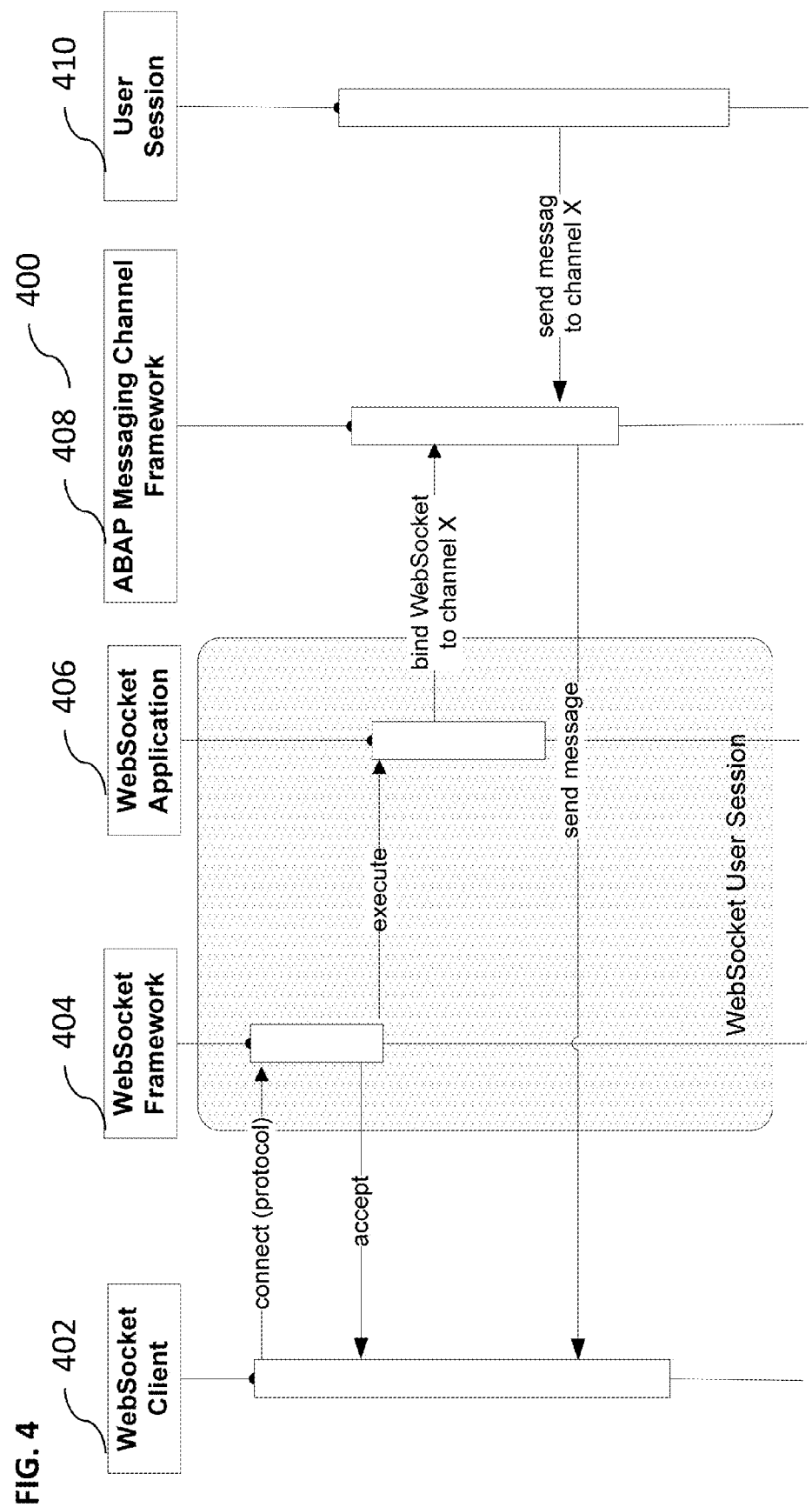
FIG. 4 illustrates an exemplary collaboration model between a WebSocket client and an ABAP user session, according to an embodiment.

With the integration of the WebSocket protocol into ABAP and in the ABAP Pusch Channel framework and ABAP messaging channel in the ABAP programming environment, it can be possible to push and exchange messages between user sessions and user residing on the same system and user agents on client systems. FIG. 4 illustrates an exemplary collaboration model 400 between a WebSocket client and an ABAP user session, according to some implementations of the current subject matter. A dedicated AMC channel can be used to provide such collaboration model 400. As shown in FIG. 4, a WebSocket client 402 can request a connection to the WebSocket user session 410, which can include a WebSocket framework 404 and a ABAP Push Channel application 406. The client 402 can send a connection request to the WebSocket framework 404 and receive a connection acceptance indication. Once the connection between the client 402 and the framework 404 is established, the framework 404 calls the application 406, wherein the WebSocket connection is bound to the ABAP messaging channel X. Alternatively, a WebSocket session can be bound to an ABAP messaging channel (not shown in FIG. 4). In this case, messages published on the ABAP messaging channel can be received/consumed by the WebSocket session and not the WebSocket connection endpoint/User agent. Here, the WebSocket session can manipulate the received message and can send it to its WebSocket connection endpoint/user agent. Once the binding between the WebSocket connection and the ABAP messaging channel is established, an external user session 410 can send messages to the WebSocket client 402 via channel X of the ABAP messaging channel framework 408. In some implementations, a WebSocket client can be any user agent, e.g., a browser, a client program that supports WebSocket protocol, and/or any agent, and/or any combination of agents.

Figure 5:
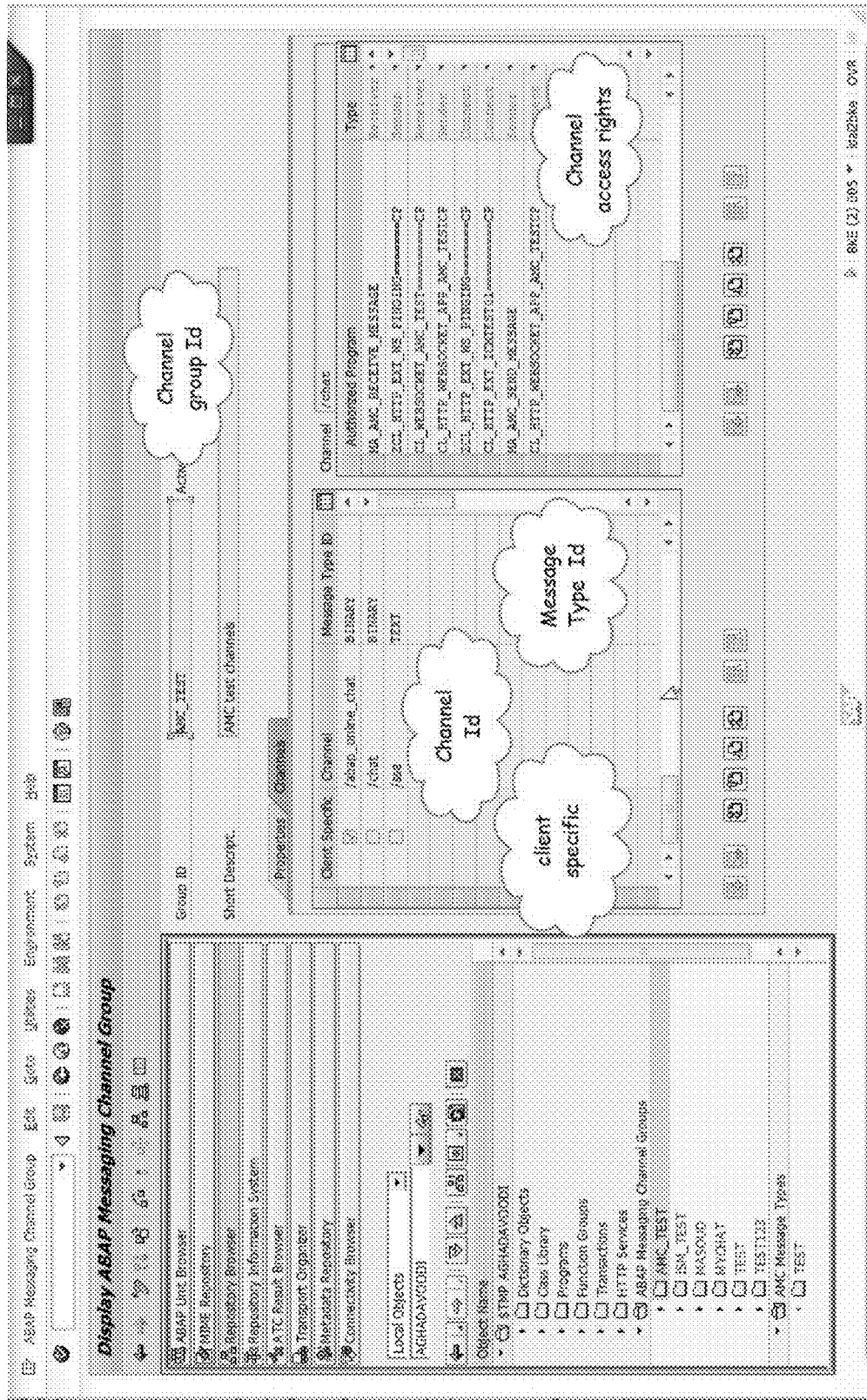
FIG. 5 illustrates an exemplary user interface containing various channel attributes, according to an embodiment.

Messaging channels can be appropriately modeled to allow for an exchange of messages between different sessions. The channels can be centrally maintained in the ABAP development workbench and can be realized as development objects with transport capabilities. The ABAP development workbench is a development environment that can be used to develop various business applications, where a user can use the ABAP development workbench to develop user's own solutions, enhance or extend capabilities of existing solutions, etc. The ABAP development workbench includes various tools for development and design of programs, screens, menus, debugging, an object repository (for storing development objects, such as, programs, dictionary data (descriptions of structures within programs), documentations, etc.). An exemplary ABAP development workbench is provided by SAP AG, Walldorf, Germany. Each messaging channel can have at least one of the following attributes: a channel group identification ("ID") (name space), a channel ID, a channel access scope, a channel access right, and a message type ID. The name space or channel group ID can be used to build up a container to specify various channels which belong to same area. Further, the channel group IDs can be unique in the whole development landscape. The channel ID can be an identifier for a single channel belonging to the same channel group ID. The addressing of messaging channels can use both the channel group ID and the channel ID. The channel access scope can define whether a messaging channel is system specific, client specific, and/or user specific. In system specific (same system) channel access scope, messages can be exchanged within the same system. In client specific channel access scope, messages can be exchanged within the same system and client. In user specific channel access scope, messages can be exchanged within the same system, client and for the same user. When the channel access scope is client specific, the exchange of messages between producer and consumer sessions can be limited to sessions residing in the same client. Channel access right can represent access rights for the messaging channels that can be realized via code based authorization, which can depend on an assigned access role that can include a producer access role and a consumer access role. For each messaging channel, and depending on whether the access role is a consumer access role or a producer access role, a white list of ABAP reports, function groups, classes, or alike can be maintained, otherwise the access can be rejected. The message type ID can be a specification of message type. A dedicated message type can be assigned to each messaging channel. Only messages of the assigned message type can be transferred over the messaging channel. FIG. 5 illustrates an exemplary user interface that contains all of the above attributes, whereby the attributes can indicate that the access APIs are type safe.

Figure 6A:
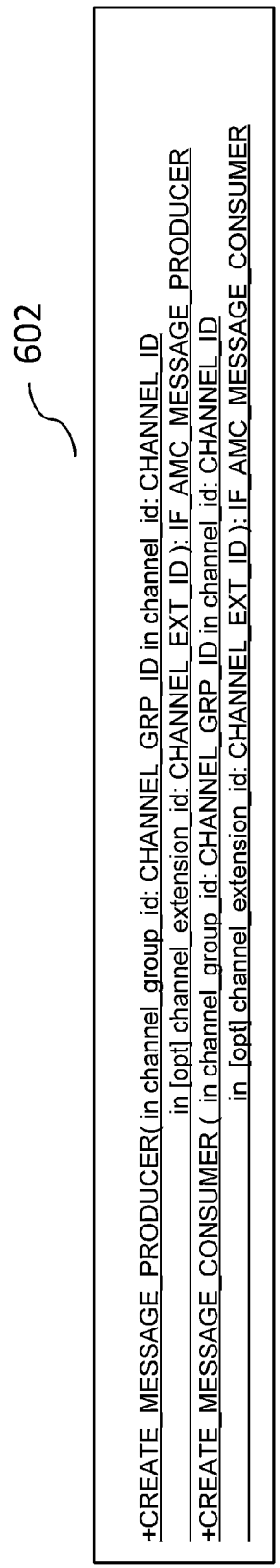
FIGS. 6a-f illustrate exemplary application programming interfaces for a process of message transfer on a dedicated channel, according to an embodiment.
Figure 6B:
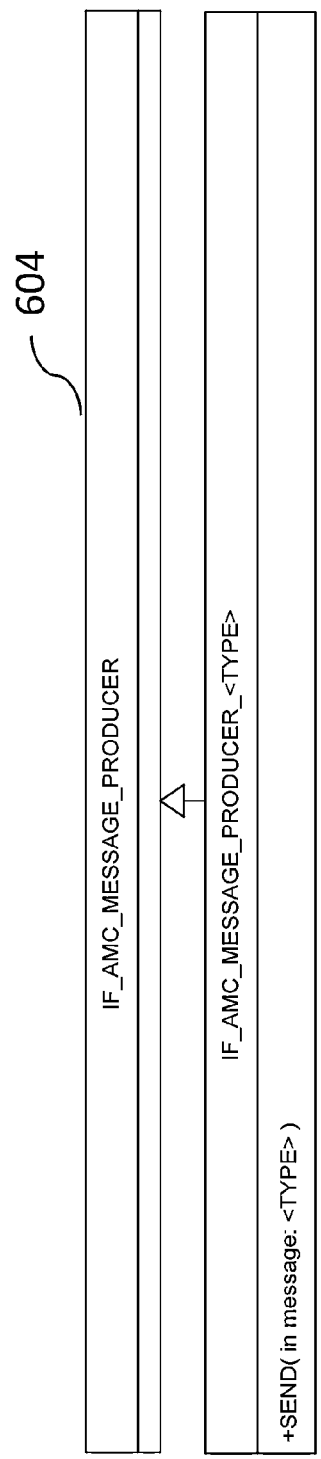
Figure 6C:
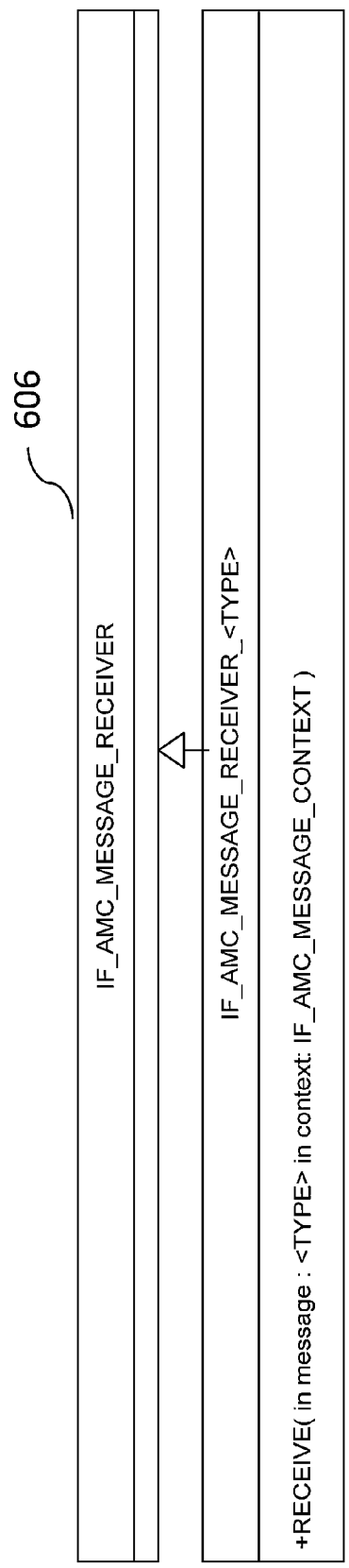
Figure 6D:
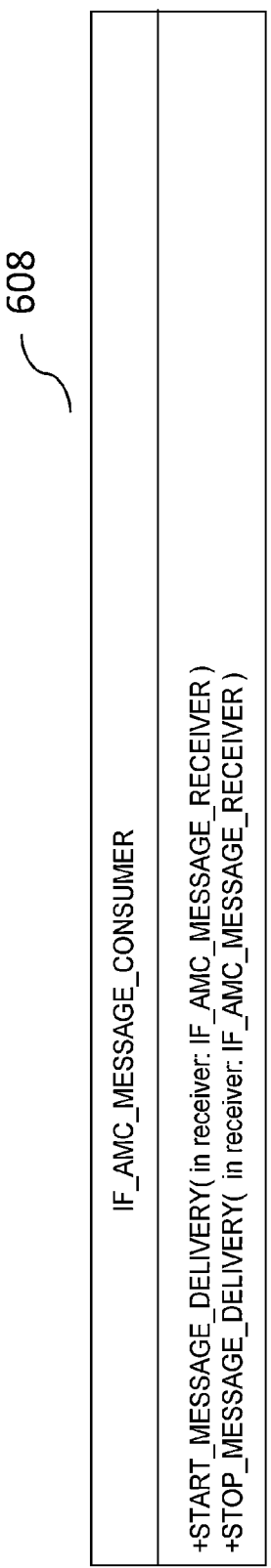
Figure 6E:
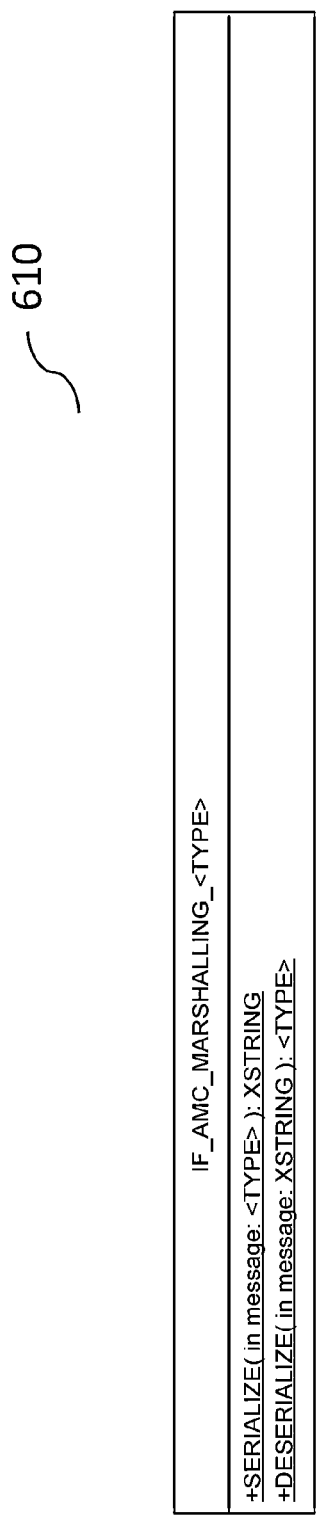
Figure 6F:
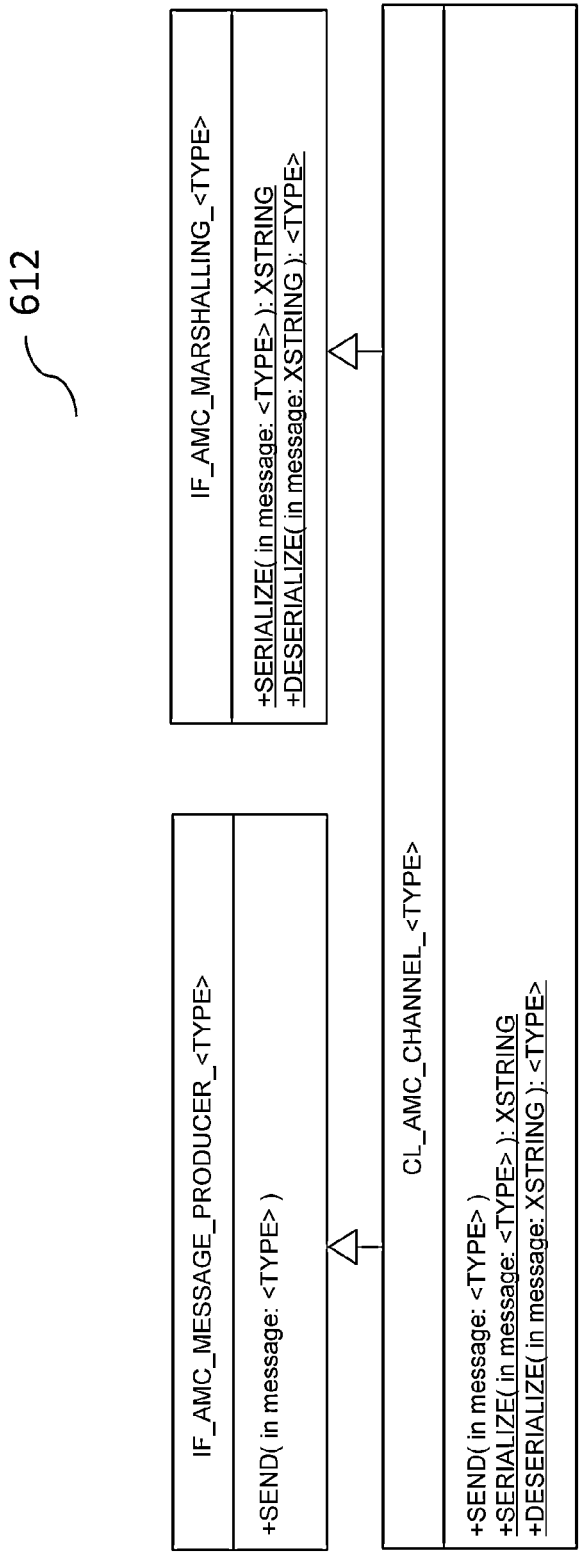

FIGS. 6a-f illustrate application programming interfaces for a process of message transfer (where messages can be of any type <TYPE>) on a dedicated channel, according to some implementations of the current subject matter. FIG. 6a illustrates an exemplary application programming interface ("API") 602 corresponding to the messaging channel factory class for creation of producer and consumer objects depending on the messaging channel. For identification of a messaging channel, besides the channel group ID and channel ID, a specification of an optional channel extension ID can be included. With the channel extension ID, the sender can restrict eligible recipients of the message (e.g., by defining the scope of the channel). FIG. 6b shows an API 604 indicating that the sender can send the associated message type <TYPE> to the related channel using a producer interface. FIG. 6c shows an API 606 showing that a callback method can be implemented for each associated message type <TYPE> according to the receiver interface for the purposes of asynchronous processing. FIG. 6d illustrates an API 608 indicating that the process of starting and stopping delivery of messages can refer to the associated receiver interface. Thus, with the consumer interface, the receiver program can control delivery and receiving phase of the messages, i.e., starting and stopping delivery of messages. FIG. 6e illustrates an API 610 containing a default de/serialization interface for customized de/serialization of messages of different types <TYPE>. FIG. 6f illustrates an API 612 for a default implementation for any message type in the AMC framework with the exception of application specific receiver interfaces (as shown in FIG. 6d). In some implementations, in order to enable a point-to-point communication, e.g., for the purposes of acknowledging the receipt of messages, the producer and consumer can use a "private channel" which can be known to the communication partners only.

Figure 7A:
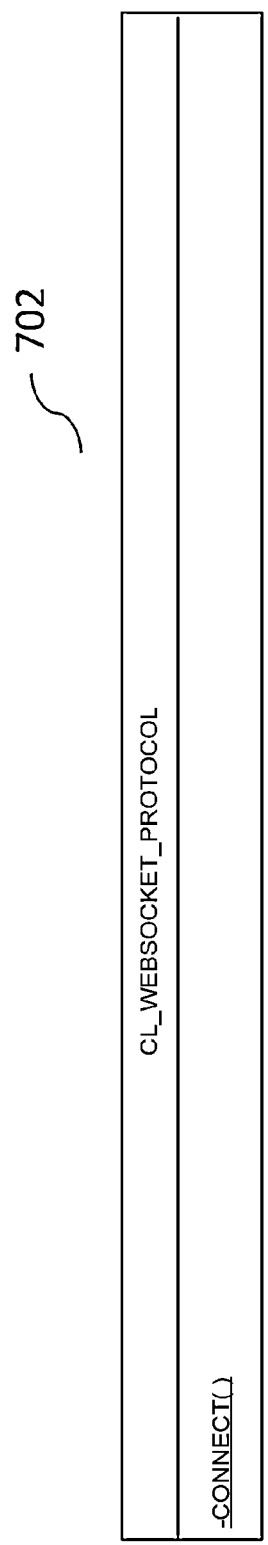
FIGS. 7a-b illustrate exemplary ABAP Push Channel for connecting a WebSocket channel to ABAP Messaging Channels, according to an embodiment.
Figure 7B:
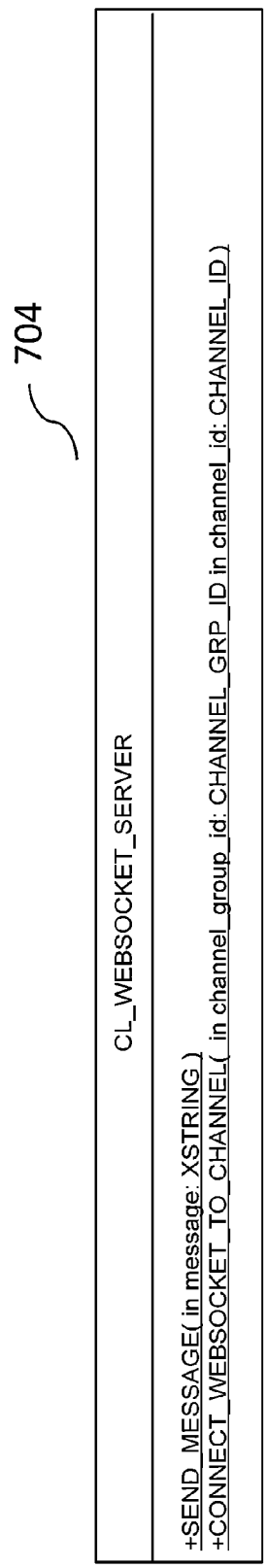

FIGS. 7a-b illustrate exemplary ABAP Push Channel application programming interfaces (for WebSocket connections), according to some implementations of the current subject matter. The ABAP Push Channel framework can provide at least one of the following capabilities: connection of a WebSocket channel to a WebSocket session (as shown by API 702 in FIG. 7a) by framework, sending of messages to the WebSocket client (as shown by API 704 in FIG. 7b), and connection of the WebSocket channel to an AMC channel to allow publishing of messages from different user sessions to the WebSocket client (as shown by the API 704 in FIG. 7b).

Figure 8:
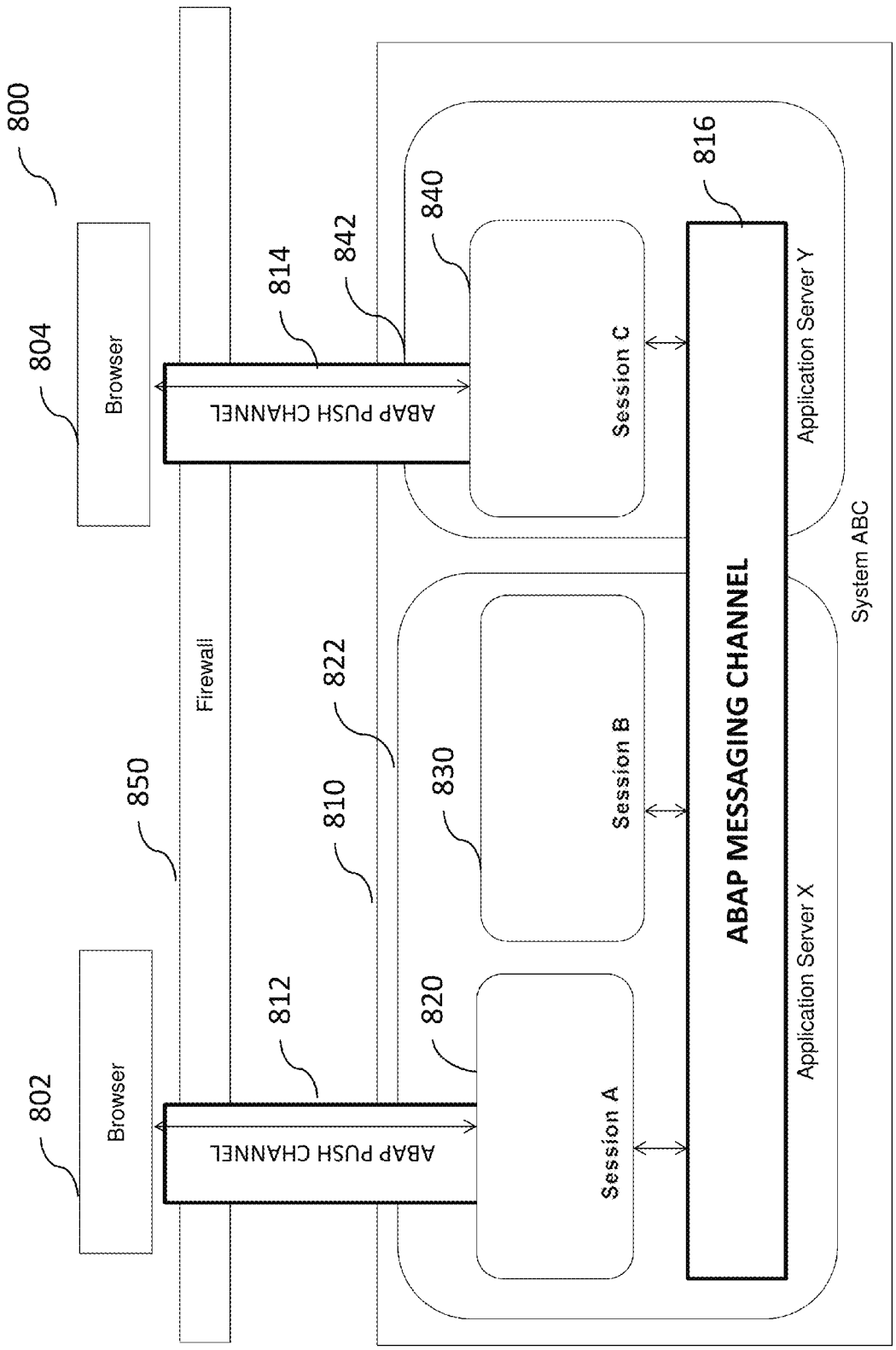
FIG. 8 illustrates an exemplary system for providing exchange of messages between various clients, according to an embodiment.

FIG. 8 illustrates an exemplary system 800 for providing exchange of messages between various clients, according to some implementations of the current subject matter. The system 800 can include a browser 802 and a browser 804 that can communicate with one another via a system ABC 810. Browsers 802 and 804 can be HTML5 browsers or can be any other clients. The system 810 can include an application server X 822 and an application server Y 842 that can communicate with one another. In some implementations, the system 800 can include a firewall 850 to protect the system 810. The clients can be user agents, WebSocket clients, browsers, client programs, and/or any other agents, and/or any combination of agents.

The application server X 822 can include session A 820 and session B 830. The session A 820 can access an ABAP push channel 812 and an ABAP messaging channel 816. The session B 830 can access the ABAP messaging channel 816. The session A 820 and the session B 830 may communicate using the messaging channel 816. The browser 802 can receive notifications from the ABAP push channel 812, which, in turn, can be received from the ABAP messaging channel 816 via the session A.

The application server Y 842 can include session C 840. The session C 840 can access an ABAP push channel 814 and the ABAP messaging channel 816. Browser 804 can receive notifications from the ABAP push channel 814, which, in turn, can be received from the ABAP messaging channel 816. The server X 822 and the server Y 842 can communicate via the ABAP messaging channel 816.

Figure 9:
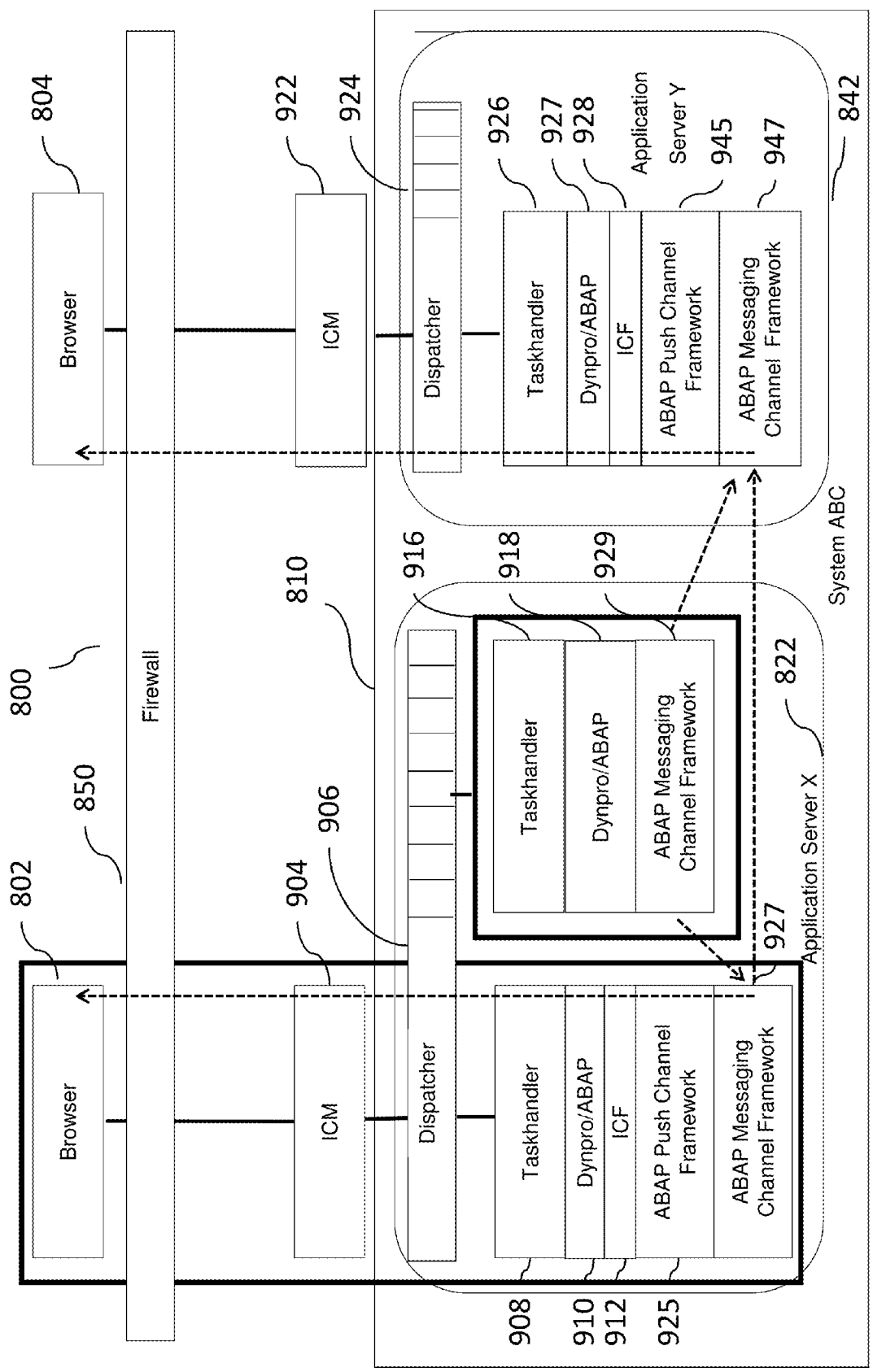
FIG. 9 provides further details of FIG. 8 and illustrates various layers that can exist in the ABAP push channel and ABAP messaging channel frameworks shown in the system shown in FIG. 8, according to an embodiment.

FIG. 9 provides further details of FIG. 8 and illustrates various layers that can exist in the ABAP push channel and ABAP messaging channel frameworks as shown in the system 800. As shown in FIG. 9, the communication between the browser 802 and the application server X 822 can include various layers, e.g., an internet connection manager ("ICM") 904, a task handler 908, etc. Similarly, the communication between the browser 804 and the application server Y 842 can include various layers, e.g., an ICM 922, a task handler 926, etc. The various layers are discussed below. The task handler 916 can have similar functionalities as the task handlers 908 and 926. These components can provide appropriate integration of the WebSocket protocol and/or the alternative protocol (e.g., server sent event/long polling) in the ICM. They can also provide an appropriate server infrastructure for messaging, connection, session and error handling for the WebSocket protocol. In particular, for the ABAP messaging channel framework, these components can provide at least one of the following: messaging channels for point-to-multipoint communication as well as the abstraction layer/framework ABAP Push Channel based on any protocol providing push capability (long polling, server sent events, etc,) point-to-multipoint messaging between ABAP sessions, point-to-multipoint messaging to WebSocket and server sent event connections, point-to-multipoint messaging to WebSocket connections, synchronization statement WAIT UNTIL <log exp.> UP TO <time> SECONDS (which can be extended to include dedicated receiving of ABAP messaging channel messages), I-Mode related messaging, restricted actions in message handler routine, dedicated statistical records, reflection of existing infrastructure components, e.g., batch events, messaging to various external servers/systems, message filtering, and reliable messaging. For ABAP push channels, these components can provide at least one of the following: integration of WebSocket in ICM, synchronization statement, e.g. WAIT UNTIL <log exp.> UP TO <time> SECONDS for receiving of WebSocket messages, message, connection, session and error handling between ICM, Taskhandler and Push Channel Framework, integration of server sent event protocol in ICM, and a client communication of WebSocket (and server sent event) protocol for unit tests.

The Dynpro/ABAP components 910, 918, and 927 can provide at least one of the following: asynchronous message handling, a programming model for synchronization points, messaging, connection, session and error handling for ABAP messaging channel and ABAP push channel. An exemplary Dynpro technology, provided by SAP AG, Walldorf, Germany, can include a business application development and runtime environments that can contain various programming tools. Additionally, for ABAP push channel, these components can provide at least one of the following: bi-directional communication to WebSocket client sessions, and protocol specific messaging to WebSocket clients, e.g., text, binary, etc. For the ABAP messaging channel, these components can provide at least one of the following: a synchronization statement, e.g. WAIT UNTIL <log exp.> UP TO <time> SECONDS for receiving of various message types, i.e., asynchronous RFC, ABAP Messaging Channel messages, WebSocket messages, a synchronization statement, e.g. WAIT UNTIL <log exp.> UP TO <time> SECONDS, an asynchronous message handling, i.e., stacked context handling, and ABAP compiler support of the ABAP messaging channel.

The internet communication framework ("ICF") components 912 and 928 can provide appropriate connectivity. The ABAP push channel applications can be integrated into the ICF 912 and/or 928. The ICF 912 and/or 928 can further provide a programming model, an API and a framework, and a message and troubleshooting infrastructure. For the ABAP push channel, these components can provide at least one of the following: an ABAP push channel framework for integration of WebSocket and server sent event protocols, design time of ABAP push channel applications based on WebSocket protocol, a programming model based on WebSocket protocol, a message, connection, session and error handling in the push channel framework, a bi-directional communication in the WebSocket session, documentation, reference examples, and an implementation of server sent events in push channel framework. For the ABAP messaging channel, these components can provide at least one of the following: design time of ABAP messaging channel, design time of ABAP message types, a programming model for point-to-multipoint messaging between ABAP sessions, messaging to WebSocket and server sent event connections, implementation of messaging to WebSocket connections, error handling, debugging, documentation and reference examples, implementation of messaging to server sent event connections, messaging to external servers/systems, and persistence messages.

ABAP push channel frameworks 925 and 945 can be included in the ABAP push channels 812 and 814, respectively (as shown in FIG. 8), and can correspond to the sessions 820 and 840. The frameworks 925 and 945 can provide appropriate security for push channel applications. In particular, for push channel applications, these frameworks can provide an authentication concept and secure messaging to clients (e.g., XSS, XSRF, virus scan, etc.). ABAP messaging channel frameworks 927, 929 and 947 can be included in the messaging channel 816 and can correspond to the sessions A, B, and C (shown in FIG. 8), respectively. For the ABAP messaging channel 816, the ABAP push channel framework components 925 and 945 can provide an authorization concept and a security concept for messaging inside a system and different sessions as well as messaging between different systems and their sessions.

Figure 10:
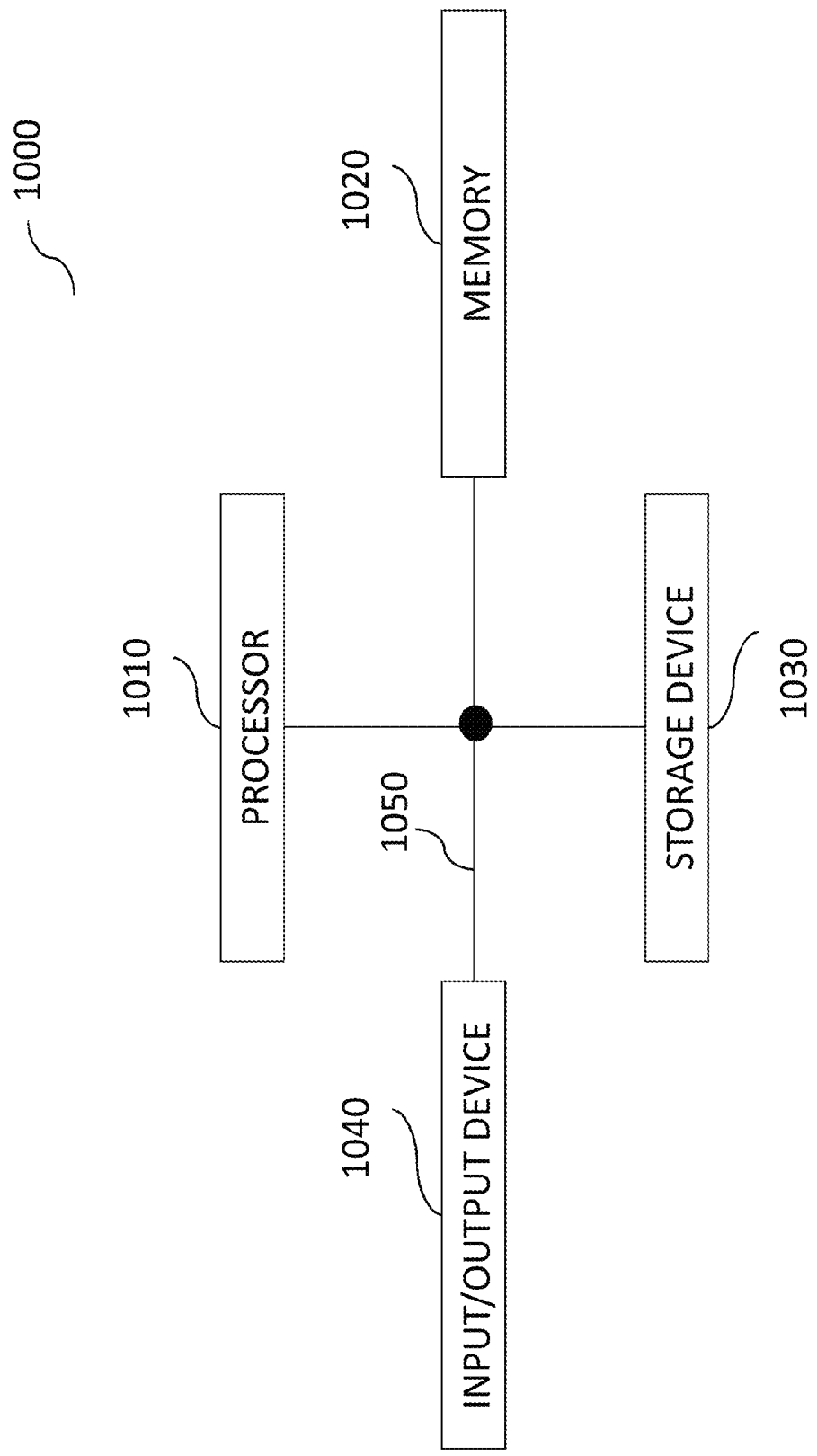
FIG. 10 illustrates an exemplary system, according to an embodiment.

In some implementations, the current subject matter can be configured to be implemented in a system 1000, as shown in FIG. 10. The system 1000 can include a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 1000. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

Figure 11:
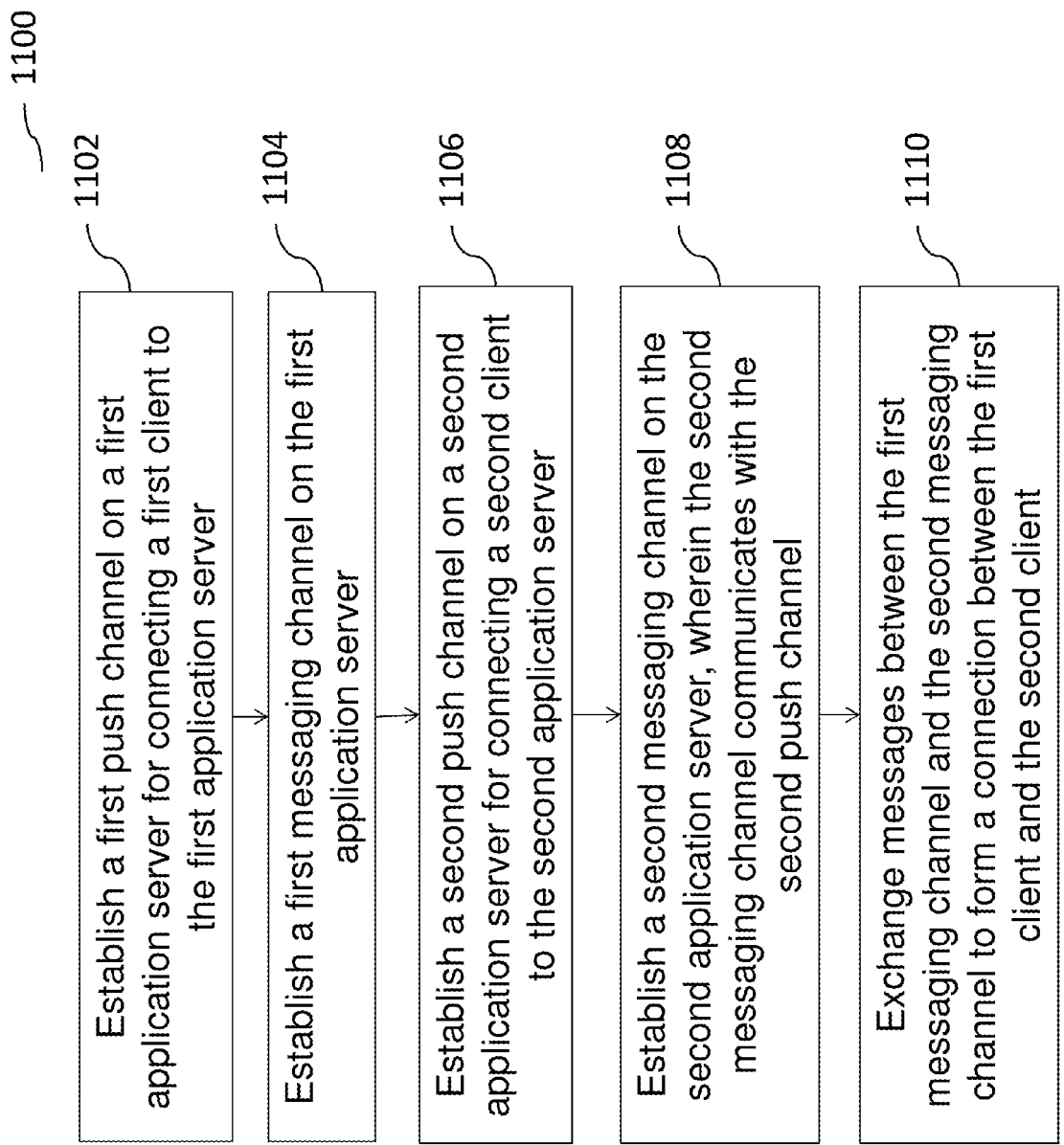
FIG. 11 illustrates an exemplary method, according to an embodiment.

FIG. 11 illustrates an exemplary method 1100, according to some implementations of the current subject matter. At 1102, a first push channel on a first application server for connecting a first client to the first application server can be established. At 1104, a first messaging channel on the first application server can be established. The first messaging channel can communicate with the first push channel. The first push channel and the first messaging channel can form a first session corresponding to the first client. At 1106, a second push channel on a second application server for connecting a second client to the second application server can be established. The first and second application servers can communicate on a communication network. At 1108, a second messaging channel on the second application server can be established. The second messaging channel can communicate with the second push channel. The second push channel and the second messaging channel can form a second session corresponding to the second client. At 1110, messages between the first messaging channel and the second messaging channel can be exchanged to form a connection between the first client and the second client. At least one of the establishing the first push channel, the establishing the first messaging channel, the establishing the second push channel, the establishing the second messaging channel, and the exchanging can be performed on at least one processor.

In some implementations, the current subject matter can include one or more of the following optional features. The first push channel and the second push channel can be advanced business application programming push channels. The first messaging channel and the second messaging channel can be advanced business application programming messaging channels. The exchanged messages can include a connection request from at least one of the first client and the second client. Each messaging channel can include at least one attribute containing at least one of the following: a channel group identification, a channel identification, a channel access scope, a channel access right, and a message type identification. The channel group identification can identify channels that are grouped together. The channel identification can be an identifier for a channel belonging to the channel group. The channel access scope can define whether a channel is cross-client or client-specific. The channel access right can represent access rights for the channels. The message type identification can specify a message type assigned to a channel.

The first and second clients can be browsers. The first and second push channels can implement a WebSocket protocol to establish a bi-directional communication between the first and second clients and first and second application servers, respectively.

In some implementations, the exchanging of messages can include at least one of the following: an exchanging of messages during an ABAP push channel communication between an ABAP push channel client and a server (e.g., based on WebSocket/Server Sent event), an exchanging of messages during an ABAP messaging channel communication between sessions residing in a system (e.g., where the system can include several servers), and/or an exchanging of messages during a communication between an ABAP push channel client and an ABAP messaging channel session by connecting ABAP messaging channel to ABAP push channel client (where an ABAP messaging channel session can exchange (send and/or receive) messages with an ABAP push channel client).

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    establishing a first push channel on a first application server for connecting a first client to the first application server;
    establishing a first messaging channel on the first application server, wherein the first messaging channel communicates with the first push channel, the first push channel and the first messaging channel to form a first session corresponding to the first client;
    establishing a second push channel on a second application server for connecting a second client to the second application server, wherein the first and second application servers communicate on a communication network;
    establishing a second messaging channel on the second application server, wherein the second messaging channel communicates with the second push channel, the second push channel and the second messaging channel to form a second session corresponding to the second client; and
    exchanging messages between the first messaging channel and the second messaging channel to form a connection between the first client and the second client;
    wherein the first and second push channels implement a WebSocket protocol to establish a bi-directional communication between the first and second clients and first and second application servers, respectively;
    wherein the at least one of the establishing the first push channel, the establishing the first messaging channel, the establishing the second push channel, the establishing the second messaging channel, and the exchanging is performed on at least one processor.

2. The method according to claim 1, wherein the first push channel and the second push channel are advanced business application programming push channels.

3. The method according to claim 1, wherein the first messaging channel and the second messaging channel are advanced business application programming messaging channels.

4. The method according to claim 1, wherein the exchanged messages include a connection request from at least one of the first client and the second client.

5. The method according to claim 1, wherein each messaging channel includes at least one attribute containing at least one of the following: a channel group identification, a channel identification, a channel access scope, a channel access right, and a message type identification, wherein
    the channel group identification identifies channels that are grouped together;
    the channel identification is an identifier for a channel belonging to the channel group;
    the channel access scope defines whether a channel is cross-client or client-specific;
    the channel access right represents access rights for the channels; and
    the message type identification specifies a message type assigned to a channel.

6. The method according to claim 1, wherein the first and second clients are browsers.

7. The method according to claim 1, wherein the exchanging of messages can include at least one of the following: an exchanging of messages during an advanced business application programming (ABAP) push channel communication between an ABAP push channel client and a server, an exchanging of messages during an ABAP messaging channel communication between sessions, and an exchanging of messages during a communication between an ABAP push channel client and an ABAP messaging channel session by connecting ABAP messaging channel to ABAP push channel client.

8. A computer program product comprising a non-transitory machine-readable medium storing instructions that, when executed by at least one programmable processor, cause the at least one programmable processor to perform operations comprising:
    establishing a first push channel on a first application server for connecting a first client to the first application server;
    establishing a first messaging channel on the first application server, wherein the first messaging channel communicates with the first push channel, the first push channel and the first messaging channel to form a first session corresponding to the first client;
    establishing a second push channel on a second application server for connecting a second client to the second application server, wherein the first and second application servers communicate on a communication network;
    establishing a second messaging channel on the second application server, wherein the second messaging channel communicates with the second push channel, the second push channel and the second messaging channel to form a second session corresponding to the second client; and
    exchanging messages between the first messaging channel and the second messaging channel to form a connection between the first client and the second client;
    wherein the first and second push channels implement a WebSocket protocol to establish a bi-directional communication between the first and second clients and first and second application servers, respectively.

9. The computer program product according to claim 8, wherein the first push channel and the second push channel are advanced business application programming push channels.

10. The computer program product according to claim 8, wherein the first messaging channel and the second messaging channel are advanced business application programming messaging channels.

11. The computer program product according to claim 8, wherein the exchanged messages include a connection request from at least one of the first client and the second client.

12. The computer program product according to claim 8, wherein each messaging channel includes at least one attribute containing at least one of the following: a channel group identification, a channel identification, a channel access scope, a channel access right, and a message type identification, wherein
    the channel group identification identifies channels that are grouped together;
    the channel identification is an identifier for a channel belonging to the channel group;
    the channel access scope defines whether a channel is cross-client or client-specific;
    the channel access right represents access rights for the channels; and
    the message type identification specifies a message type assigned to a channel.

13. The computer program product according to claim 8, wherein the first and second clients are browsers.

14. The computer program product according to claim 8, wherein the exchanging of messages can include at least one of the following: an exchanging of messages during an advanced business application programming (ABAP) push channel communication between an ABAP push channel client and a server, an exchanging of messages during an ABAP messaging channel communication between sessions, and an exchanging of messages during a communication between an ABAP push channel client and an ABAP messaging channel session by connecting ABAP messaging channel to ABAP push channel client.

15. The computer program product according to claim 8, wherein the exchanging of messages can include at least one of the following: an exchanging of messages from an ABAP server to an agent or user supporting a WebSocket protocol, and an exchanging of messages between different ABAP sessions residing on different servers.

16. A system comprising:
    at least one programmable processor; and
    a machine-readable medium storing instructions that, when executed by the at least one programmable processor, cause the at least one programmable processor to perform operations comprising:
        establishing a first push channel on a first application server for connecting a first client to the first application server;
        establishing a first messaging channel on the first application server, wherein the first messaging channel communicates with the first push channel, the first push channel and the first messaging channel to form a first session corresponding to the first client;
        establishing a second push channel on a second application server for connecting a second client to the second application server, wherein the first and second application servers communicate on a communication network;
        establishing a second messaging channel on the second application server, wherein the second messaging channel communicates with the second push channel, the second push channel and the second messaging channel to form a second session corresponding to the second client; and
        exchanging messages between the first messaging channel and the second messaging channel to form a connection between the first client and the second client;
    wherein the first and second push channels implement a WebSocket protocol to establish a bi-directional communication between the first and second clients and first and second application servers, respectively.

17. The system according to claim 16, wherein
    the first push channel and the second push channel are advanced business application programming push channels;
    the first messaging channel and the second messaging channel are advanced business application programming messaging channels;
    the exchanged messages include a connection request from at least one of the first client and the second client; and
    the exchanging of messages can include at least one of the following: an exchanging of messages during an advanced business application programming (ABAP) push channel communication between an ABAP push channel client and a server, an exchanging of messages during an ABAP messaging channel communication between sessions, and an exchanging of messages during a communication between an ABAP push channel client and an ABAP messaging channel session by connecting ABAP messaging channel to ABAP push channel client.

18. The system according to claim 16, wherein each messaging channel includes at least one attribute containing at least one of the following: a channel group identification, a channel identification, a channel access scope, a channel access right, and a message type identification, wherein
    the channel group identification identifies channels that are grouped together;
    the channel identification is an identifier for a channel belonging to the channel group;
    the channel access scope defines whether a channel is cross-client or client-specific;
    the channel access right represents access rights for the channels;
    the message type identification specifies a message type assigned to a channel;
    the first and second clients are browsers.

* * * * *